(12) United States Patent
Jeon

(10) Patent No.: US 10,083,673 B2
(45) Date of Patent: Sep. 25, 2018

(54) SYSTEM FOR PROCESSING DEVICE AND DISPLAY CHARACTERISTIC CONTROL SUITABLE FOR MOBILE PHONE AND OTHER DEVICES

(71) Applicant: Samsung Electronics Co., Ltd., Gyeonggi-do (KR)

(72) Inventor: Yong-Joon Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 98 days.

(21) Appl. No.: 14/082,370

(22) Filed: Nov. 18, 2013

(65) Prior Publication Data

US 2014/0139567 A1 May 22, 2014

(30) Foreign Application Priority Data

Nov. 20, 2012 (KR) .................. 10-2012-0131486

(51) Int. Cl.
    *G09G 3/34* (2006.01)
    *G09G 5/10* (2006.01)
    *G06F 1/32* (2006.01)
    *H04W 52/02* (2009.01)

(52) U.S. Cl.
    CPC ............ *G09G 5/10* (2013.01); *G06F 1/3209* (2013.01); *G06F 1/3265* (2013.01); *G09G 3/34* (2013.01); *H04W 52/027* (2013.01); *G09G 2330/022* (2013.01); *G09G 2370/22* (2013.01); *Y02D 10/153* (2018.01); *Y02D 70/26* (2018.01)

(58) Field of Classification Search
    CPC .......................................... G09G 3/34

USPC ................................... 345/173–178
See application file for complete search history.

(56) References Cited

U.S. PATENT DOCUMENTS

| 2006/0132474 A1* | 6/2006 | Lam ......................... G09G 3/20 345/204 |
| 2008/0218535 A1* | 9/2008 | Forstall ................. G06F 1/3203 345/690 |
| 2010/0117949 A1* | 5/2010 | Lai et al. ...................... 345/102 |
| 2011/0142519 A1* | 6/2011 | Tsukuda ................. B41J 3/4075 400/76 |

(Continued)

FOREIGN PATENT DOCUMENTS

| CN | 102467882 A | 5/2012 |
| KR | 10-0905573 B1 | 6/2009 |
| KR | 10-2011-0103089 A | 9/2011 |

OTHER PUBLICATIONS

European Search Report dated Nov. 9, 2016.
Chinese Search Report dated Aug. 11, 2017.

*Primary Examiner* — Dennis Joseph
(74) *Attorney, Agent, or Firm* — Cha & Reiter, LLC.

(57) ABSTRACT

A system determines a time period used for controlling a backlight and other processing device power consumption related characteristics to more closely reflect user intent determined in response to an operation state of an application, for the system determines the operation state based on, activity of an application in requesting transmission and reception of data, display screen update and completion of presentation of a view configuration (display area) The system reduces inadvertent turning off of a backlight and other device power consumption features.

13 Claims, 7 Drawing Sheets

(56) References Cited

U.S. PATENT DOCUMENTS

| | | |
|---|---|---|
| 2011/0181611 A1* | 7/2011 | Zhang .................... G09G 3/342 345/589 |
| 2012/0105490 A1 | 5/2012 | Pasquero et al. |
| 2012/0151236 A1 | 6/2012 | Vandeputte et al. |
| 2012/0157073 A1 | 6/2012 | Kim et al. |
| 2012/0169594 A1* | 7/2012 | Zhao et al. .................... 345/158 |
| 2012/0256967 A1* | 10/2012 | Baldwin et al. .............. 345/684 |

* cited by examiner

SYSTEM FOR PROCESSING DEVICE AND DISPLAY CHARACTERISTIC CONTROL SUITABLE FOR MOBILE PHONE AND OTHER DEVICES

CROSS RELATED APPLICATION

This application claims priority under 35 U.S.C. § 119(a) to Korean Patent Application Serial No. 10-2012-0131486, which was filed in the Korean Intellectual Property Office on Nov. 20, 2012, the contents of which are incorporated herein by reference.

TECHNICAL FIELD

The present disclosure concerns a system for control of display characteristics including a backlight of a portable device (phone, notebook, computer, watch, for example), for example.

BACKGROUND

Multi-media processing devices have become prevalent and tend to be light and slim minimizing weight and size with corresponding slim batteries which provide power to the media devices. However, the demands on the device batteries including the number of installed executable applications and power consumed during execution of the applications tends to increase enhancing the need for managing power of the media devices in a smart fashion.

It is known to manage power of a media device by control of a time period of driving a backlight by turning off a backlight where there is no input from a user during a predetermined time period. However, a backlight is sometimes turned off in known systems irrespective of an intention of a user, so that the user is inconvenienced. For example, when the user reads text by using a particular application, the media device turns off the backlight if a set time period elapses leading to user dissatisfaction. A system according to invention principles addresses this deficiency and related problems.

SUMMARY

A system according to invention principles controls a time period of driving a backlight to reflect an intention of the user. A method (and apparatus for performing the methods herein) controls a time period of activating a backlight used for illumination of a screen of a media device. The method: identifies a network use state concurrently with controlling a timer used to turn off a backlight; determines whether an executable application having requested transmission or reception of data, is activated, in response to a result of the identification showing the network use state indicates active transmission or reception of data; and controls the timer in response to the determination the application is active.

The method controls the timer by initializing a time period measured by the timer, when the application is active and controls the driving of the timer by continuously driving the timer in response to an application activity state. The method determines whether the application is active by, determining whether the application is active, in response to a display state of the application, in response to an image display area associated with the application being displayed, by determining that a particular application that a user has selected from a plurality of different applications is in an active state, when multiple image display areas associated with the different applications are concurrently displayed.

In a feature of the invention, the method identifies whether a screen display area is updated with data concurrently with controlling a timer used to turn off the backlight; and controls the timer in response to the determination the screen display area (e.g. associated with an application function) is updated in the display area. The method also identifies whether the screen display area (e.g. associated with a function of the application) is updated within a predetermined time period in a display area designated by a user and turns off the backlight when the screen is not updated in the display area. Further, the method changes to a set display state when the user makes a request for designating a display area and receives data designating a display area in response to user command in the changed display state. The method generates a layer usable for user designation of the display area; causes the generated layer to overlap layers used in a previous display state; and displays the generated layer overlapping the layers used in the previous display state.

In a further feature, the method identifies whether a request by an executable application for loading data comprising content of a screen display area is made concurrently with controlling a timer used to turn off the backlight; loads the requested data; and controls the timer, in response to determining the screen display area of the application which has made the request for loading the data, is completed. The timer control prevents the backlight from being turned off until the presentation of the screen display area of the application is completed. The controller determines that the application is in an active state in response to data provided by the application being displayed in a display area.

In a further feature an apparatus controls a time period of driving a backlight, using: a display unit having a backlight; a timer which counts a time period used to determine time to switch off the backlight; and a controller configured for identifying whether a screen is updated with data in a display area of the display unit concurrently with controlling the timer, and for controlling operation of the timer in response to the identification of whether the screen is updated in the display area. The timer measures a time period for activating the backlight; and a controller is configured to identify whether a request by an executable application for loading data comprising content of a screen display area is made concurrently with controlling a timer used to turn off the backlight, loading the requested data and controlling the timer in response to determining the screen display area of the application which has made the request for loading the data, is completed.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, detailed descriptions of functions or configurations known in the art may be omitted to avoid obscuring the subject matter of the present invention.

Known systems for controlling a time period of driving a backlight typically automatically turn off a backlight of a portable device when a set time period elapses, often contrary to user desires. In contrast, a system according to invention principles controls a time period of driving a backlight in a user friendly manner and to more accurately reflect the desire and intent of a user. The system advantageously determines a user intent in response to an operation state of an executable application. In different embodiments, the system controls a time period of driving a backlight in response to at least one of, (a) an active state of an application requesting the transmission and reception of data, (b) whether a screen is updated in a display area and (c) whether a view configuration is completed. The system is applicable to a wide variety of backlit devices including, phones, watches, computers, TVs, portable processing devices, monitors and displays of various type, media devices which are devices capable of performing at least one of the recording, display and reproduction of various media content such as images, text or moving images. The media devices are deemed to include a mobile phone, a smart phone, a navigation, a Personal Digital Assistant (PDA), a Portable Multimedia Player (PMP), a Moving Picture Experts Group layer 3 (MP3) player, a game console, a tablet, a netbook, a desktop computer, a laptop computer, a communication terminal capable of Internet access, and a communication terminal capable of receiving a broadcast signal.

Hereinafter, in describing exemplary embodiments of the present invention, for convenience of description, it is assumed that a media device includes a touch screen. However, the present invention is not limited to this configuration. Accordingly, the present invention can be applied to an apparatus including various means which can replace input and display functions of the touch screen.

Figure 1:
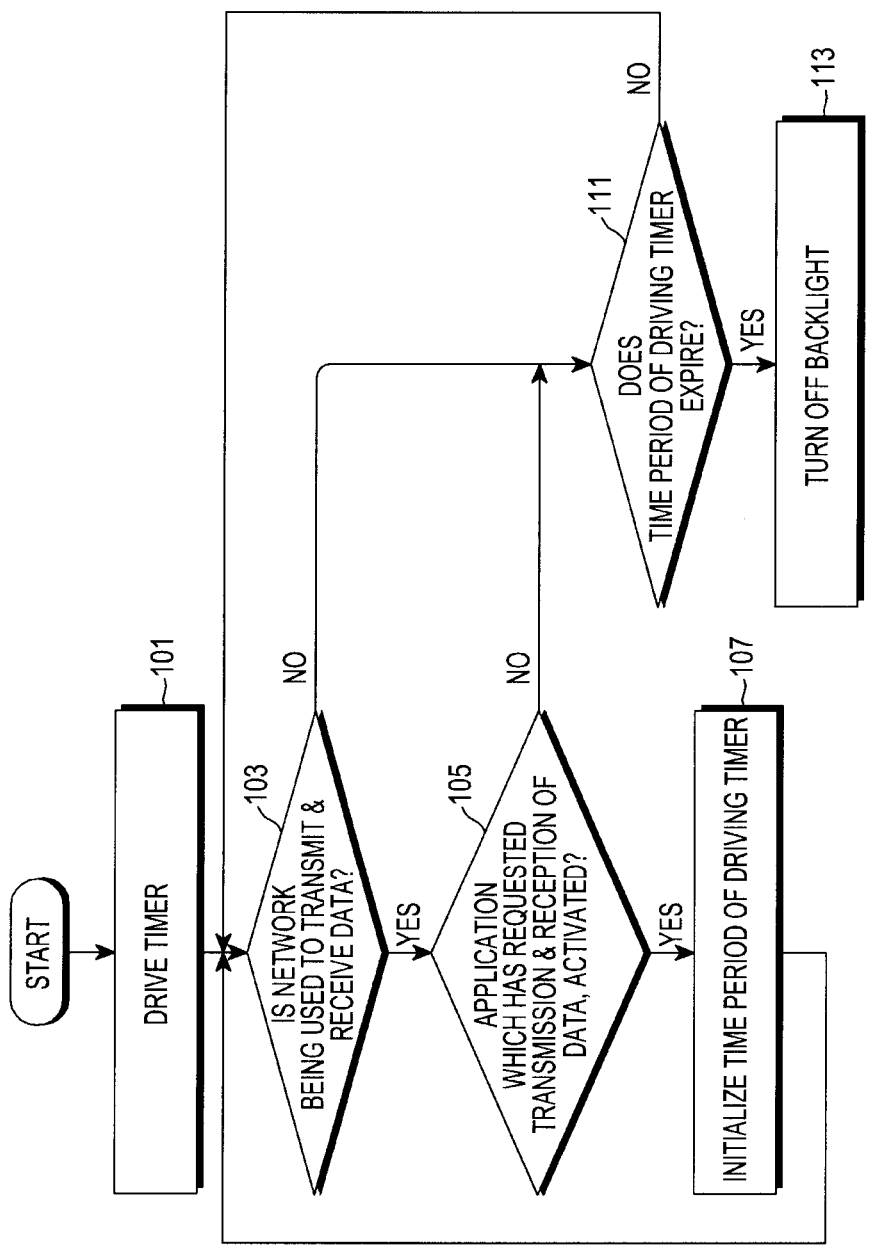
FIG. 1 shows a flowchart of a process employed by a system according to an embodiment of the present invention.

FIG. 1 shows a flowchart of a process employed by a media device system for controlling a time period of driving a backlight in response to an active state of an executable application which requests the transmission and reception of data. In step 101, a media device drives a timer for turning off a backlight. The timer for turning off a backlight, for example, may be driven from a time point of occurrence of an action of a user touching a touch screen that may change depending on the setting of the timer. In step 103, the media device determines whether the media device is in a network use state for the transmission and reception of data and if so the media device proceeds to step 105. Otherwise, the media device proceeds to step 111.

A network use state for the transmission and reception of data signifies a state of the transmission and reception of data requested by a particular application, for example. A request for the transmission and reception of data includes the execution of a particular application, the selection of a particular link existing in the particular application and the selection of a menu requesting a screen update which exists in the particular application, for example. Network use states in an embodiment exclude a state of the transmission and reception of control messages for selection and re-selection of a network communication cell and a state of transmission and reception of control messages for time synchronization.

Figure 2A:
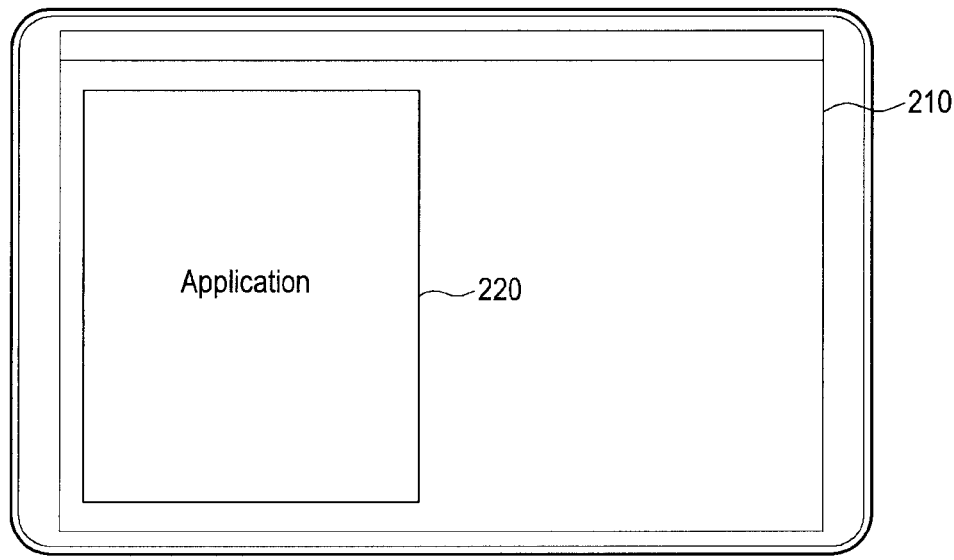
FIG. 2A and FIG. 2B show UI screens illustrating an application-active state according to an embodiment of the present invention.

In step 105, the media device is in the network use state and determines whether the application which has requested the transmission and reception of the data is in an active state in response to a display state of the requesting application. For example, in response to a display image of a requesting application being presented in whole or in part in a media device display area, the media device determines that the requesting application is in an active state. Specifically, when an application is displayed in at least one area 220 of a display area 210 as illustrated in FIG. 2A, the media device determines that the requesting application is in an active state.

Figure 2B:
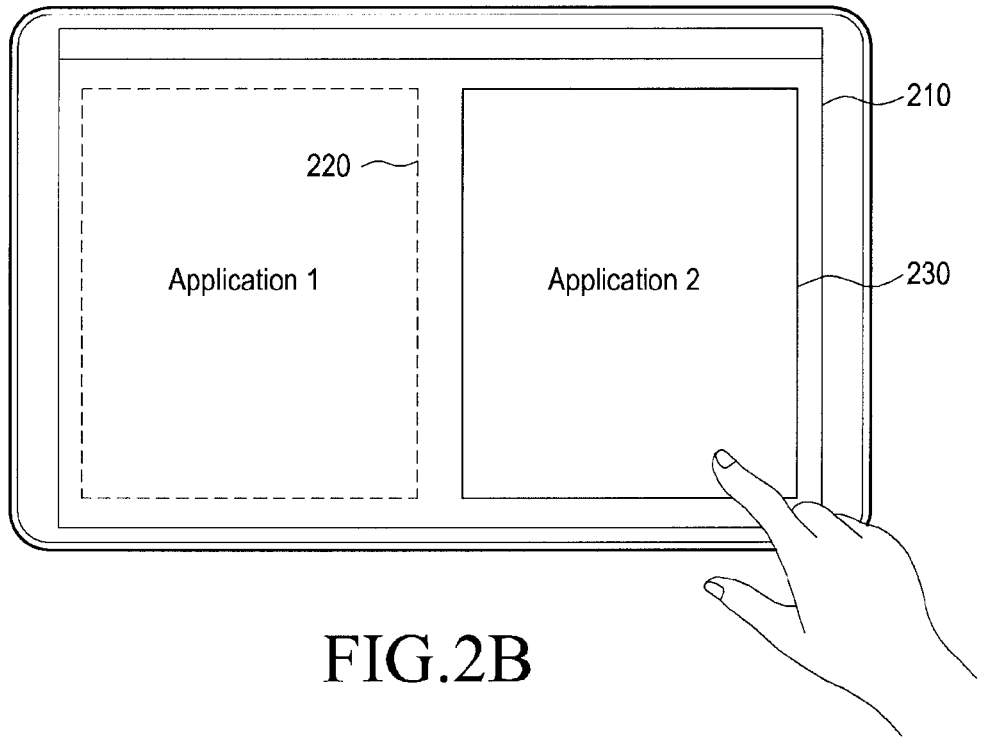

Also, when multiple applications are being displayed in a display area, the media device determines that the requesting application or an application that a user has selected, is in an active state. For example, when a first application is being displayed in the one area 220 of the display area 210 and a second application is being displayed in another area 230 of the display area 210 as illustrated in FIG. 2B, the media device determines that an application (the second application) that a user has selected from between the two applications is in an active state. Also, in response to an application being executed in a state where an application related image is not being displayed in the display area 210, when the application is being executed in background operation, for example, the media device determines that the relevant application is not in an active state. In response to a result of the determination in step 105 showing that the application which has requested the transmission and reception of the data is in an active state, the media device proceeds to step 107. Otherwise, the media device proceeds to step 111.

In step 107, the media device initializes a time period of driving a timer, and continues the process at step 103. Specifically, in step 107, in response to the requesting application being determined to be in the active state, and the media device being in the network use state for the transmission and reception of the data, the media device initializes a time period of driving the timer, in order to prevent a backlight from being turned off. The media device determines whether a time period of driving the timer expires, in step 111 where the media device is not in the network use state for the transmission and reception of the data or the application which has requested the transmission and reception of the data is not in the active state. Specifically, in step 111, the media device determines whether a time period of driving the timer expires in a state where the media device maintains driving of the timer without initializing or stopping the time period. In response to a result of the determination in step 111 showing that the time period of driving the timer expires, in step 113, the media device turns off the backlight.

Figure 3:
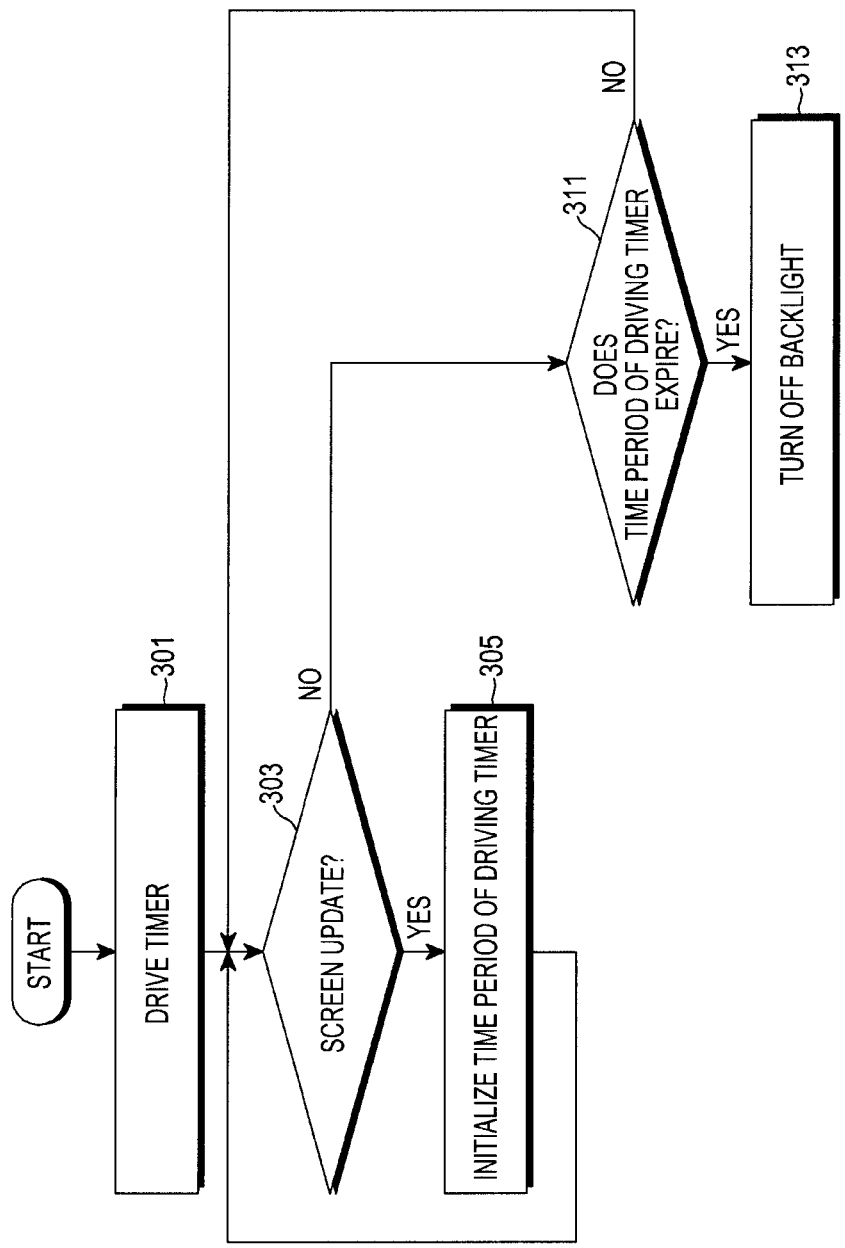
FIG. 3 shows a flowchart of a process employed by a system according to another embodiment of the present invention.

FIG. 3 shows a flowchart of a process employed by the system for controlling a time period of driving a backlight in response to whether a screen is updated in a display area. In step 301, a media device drives a timer for turning off a backlight and the timer operates from a time point of occurrence of an action of a user who touches a touch screen, for example. The time period of the timer is adaptively and dynamically changed in response to a setting of the timer. In step 303, the media device determines whether a screen is updated in a display area and if so performs step 305 and otherwise performs step 311. A determination of whether the screen is updated is made for an entire display area, a predetermined display area, or a display area designated by a user.

Figure 4A:
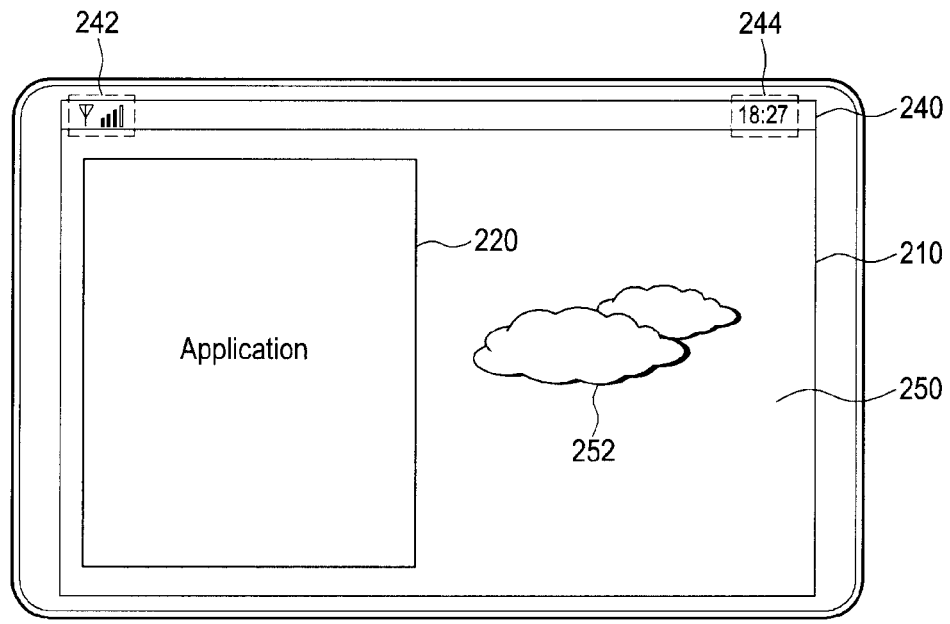
FIG. 4A, FIG. 4B, FIG. 4C, FIG. 4D, FIG. 4E and FIG. 4F show UI screens illustrating a process for determining whether a screen is updated, according to an embodiment of the present invention.

FIG. 4A to FIG. 4F show UI screens illustrating a process for determining whether a screen is updated and illustrate a state where an application is displayed in a part of the entire display area. In FIG. 4A, display area 210 includes an area 220 in which an image related to an executable application is displayed, a state bar area 240 in which a terminal state is displayed, and a background screen area 250. In this display state, the media device determines whether the screen is updated in display area 210 by determining whether the screen is updated in one or more of areas 220, 240 and 250. In another embodiment, the media device controls a time period of driving a backlight in response to location where a screen is updated in deriving a user intention to prevent a backlight from being turned off Consequently, the media device adaptively selects a screen area to exclude from a determination of whether a screen is updated. The device excludes state bar area 240 from the update determination, for example, in response to predetermined function or exclusion information associated with predetermined screen areas of requesting application display images and identifying the predetermined screen areas to be excluded from a determination of whether a screen is updated. State bar area 240, includes image element 242 representing an antenna reception sensitivity and text 244 representing current time, are frequently updated and are excluded by the media device from a determination of whether a screen is updated. Also, the device excludes background screen image 252 from the determination of whether a screen is updated since the background is identified in predetermined information to change over time unrelated to user activity or intention. The media device determines whether area 220 specifically related to a requesting application is updated, excluding other areas (e.g. 240, 250).

Figure 4B:
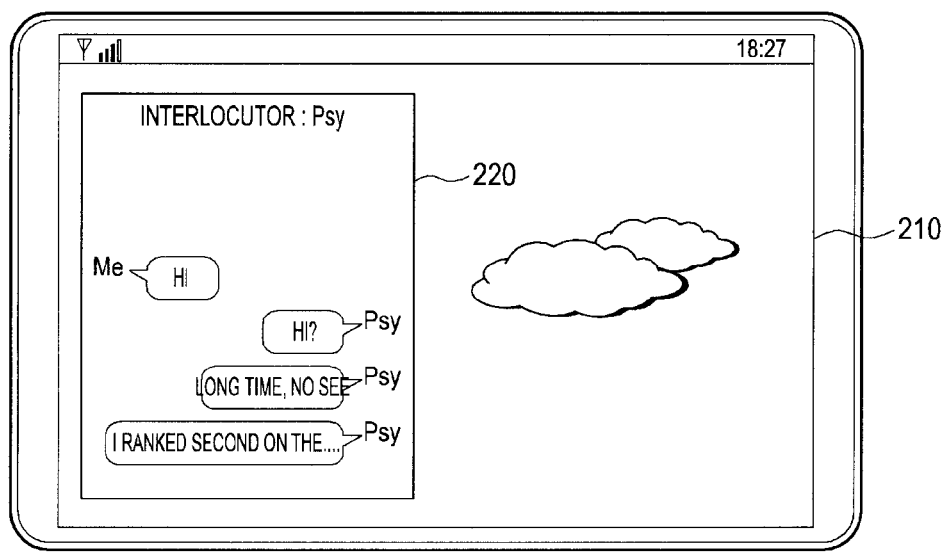

In FIG. 4B, a user is using an application and associated screen area 220 enabling the user to chat with a counterpart excluding other screen areas. The media device exclusively determines from the type of application using area 220, excluding other screen areas, to inhibit the backlight from being turned off although in this state the user only reads the writing of the counterpart in area 220 and does not perform an input operation during a predetermined time period.

Figure 4C:
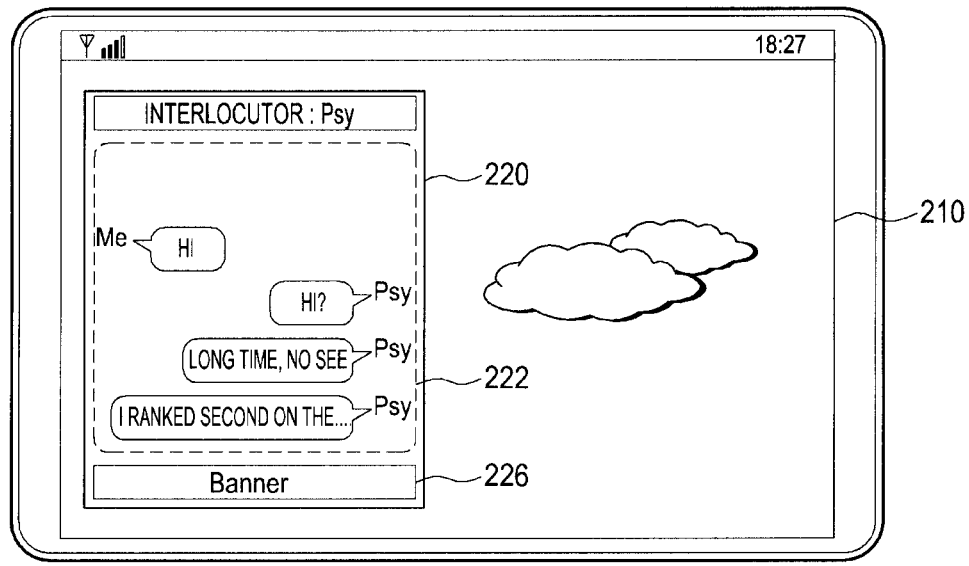

In FIG. 4C, a banner 226 is incorporated in area 220 of an associated executable application and banner 226 may change over time. The media device adaptively identifies the type of function that area 226 and other areas (both within and external to an application area) are associated with using predetermined information associating screen areas with function and exclusion identifiers and excludes banner 226 within the area 220 from the determination of whether a screen is updated. In FIG. 4C, the determination of whether a screen is updated is performed in response to chatting area 222 in the area 220 where the application is being displayed, for example, excluding particular areas within application area 220.

The media device selects area 222 (e.g., the chatting area 222) in response to a predetermined area update characteristic identifying a particular function is performed in area 222 of displayed application area 220 and indicating update of area 222 is usable for backlight control. The update characteristic may also be set or determined by the application associated with area 220. For example, when the relevant application provides information concerning area 222 to a Windows system, the Windows system determines whether area 222 is updated.

Figure 4D:
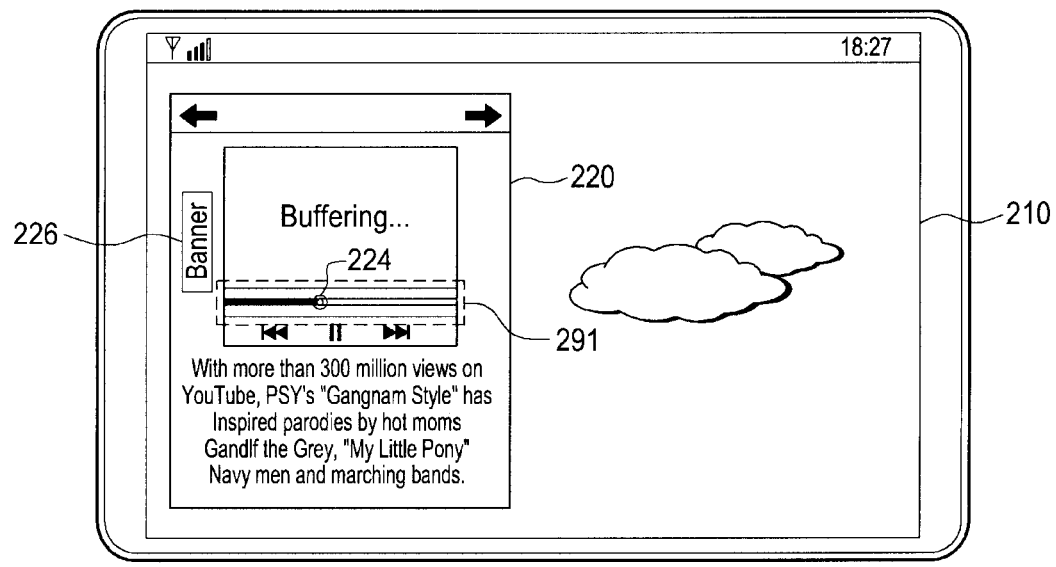

FIG. 4D illustrates buffering performed in a state of performing a pause function during loading of a moving image, in an application performing a web browsing function where banner 226 is incorporated in image area 220. The media device determines whether the screen is updated in response to update of a buffering display area 291 including a pointer 224 indicating the degree of current buffering. The media device acquires position information of the buffering display area 291 from the relevant application for use in determining screen update for backlight control. Further, a user is able to designate a screen area for determining whether a screen is updated as described in connection with FIG. 4E and FIG. 4F.

Figure 4E:
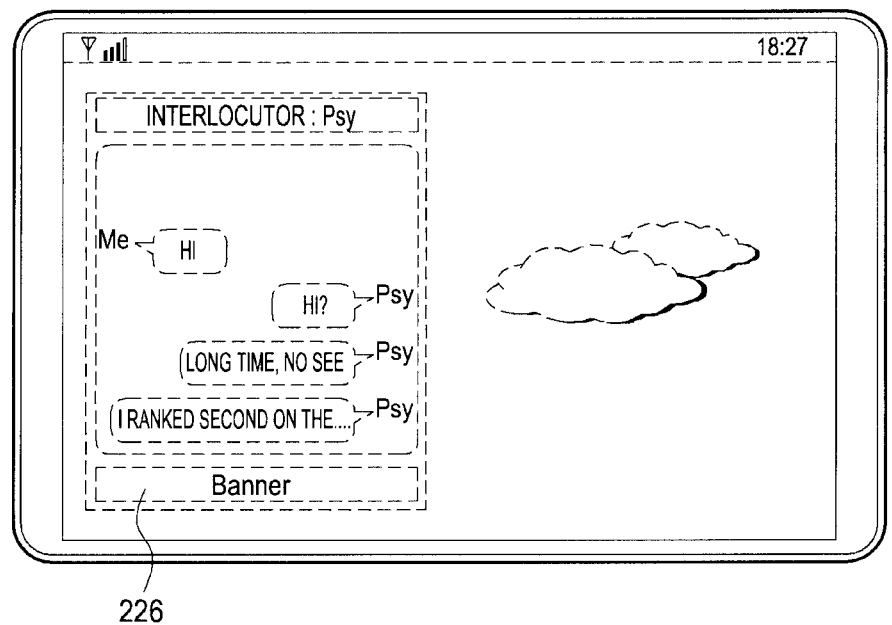
Figure 4F:
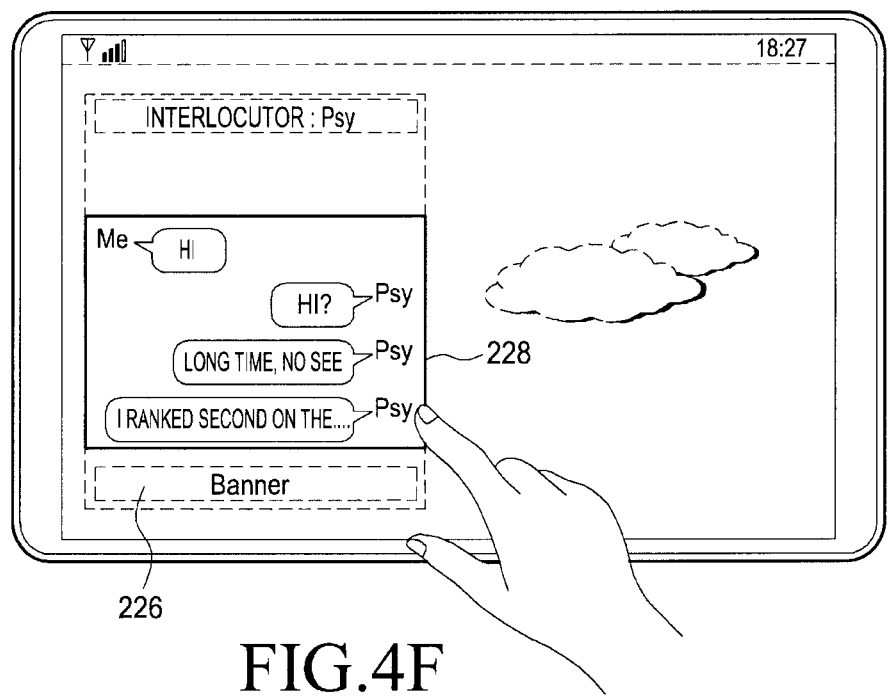

FIG. 4E shows a mode in which a user designates an area (hereinafter, referred to as a "screen update sensing area") for determining whether a screen is updated. The entry into such a mode is accomplished by selecting a particular menu or in response to user touch of a touch screen. Designation of a screen update sensing area is performed in a display state different from the previous display state. In response to a user making a request for designating a screen update sensing area, the media device changes a display state to a predetermined display state associated with user designated screen update sensing in one of a different methods. FIG. 4E illustrates a translucent layer additionally displayed on layers presented in the previous display state. Specifically, the media device displays a new layer in such a manner that the new layer overlaps the layers displayed before a display change. Further, an action of a user performed in initiating such a change in display state is recognized as an action for designating a screen update sensing area and although the user touches banner 226 in the display state of FIG. 4E, the media device overrides the action and inhibits connection to site associated with the banner. In response to a user performing a touch and drag action, for example, and designation of a display area as illustrated in FIG. 4F, the media device monitors the user designated area.

Referring again to FIG. 3, in step 305, in response to a determined screen updat in a selected display area, the media device initializes a time period of driving the timer and continues with step 303. In step 305, the media device determines that the intention of the user is to prevent the backlight from being turned off, and controls driving of the timer in such a manner as to prevent the backlight from being turned off. In step 311, in response to a determination in step 303 that the screen is not updated, the media device determines whether the time period of driving the timer expires and if it expires, turns off the backlight, thief it is determined the time period of driving the timer does not expire, the media device continues with step 303 and continuously monitors whether the screen is updated in the display area concurrently with maintaining driving of the timer.

Figure 5:
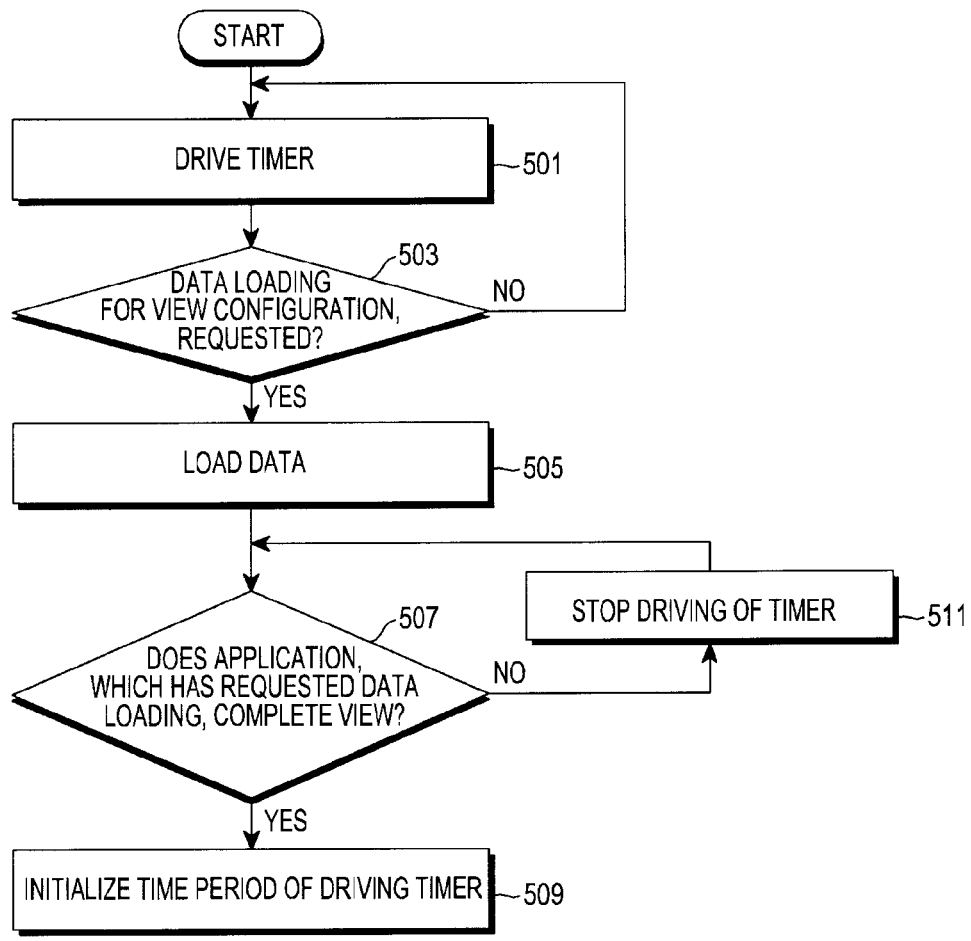
FIG. 5 shows a flowchart of a process employed by a system according to a further embodiment of the present invention.

FIG. 5 shows a flowchart of a process for controlling a time period of driving a backlight based on whether a view configuration is completed. In step 501, the media device drives the timer to turn off the backlight by configuring the timer with a predetermined time duration (e.g. a clock count) from a time point of occurrence of an action of a user touching a touch screen. The time period changes based on configuration and setting of the timer. In step 503, the media device adaptively determines a time duration setting of the timer in response to type of application area using predetermined information e.g. a lookup table associating a type of application area and a time duration. In response to a request for loading data for a view configuration being made in step 503, the media device in step 505, and loads the requested timer time duration data.

The media devices loads data by loading data from a memory or acquired by downloading of data through a network, for example. A media device request comprises a request for, loading data for a display area, downloading data from a network for configuring a display are associated with an application, or loading various media content, such as electronic books and moving images, stored in the media device and configuring a view of an application, for example.

In response to completion of loading of the data, in step 507, the media device determines whether an application, which has made the request for loading the data, completes presentation of a display area based on information provided by the application. A Windows system may determine whether the relevant application completes the display area, for example. In step 509, the media device initializes the time period of driving the timer. In step 511, if an application fails to present a display area (does not complete the view), the media device stops driving of the timer by using a control operation for preventing the backlight from being turned off, and continues with step 507.

Figure 6:
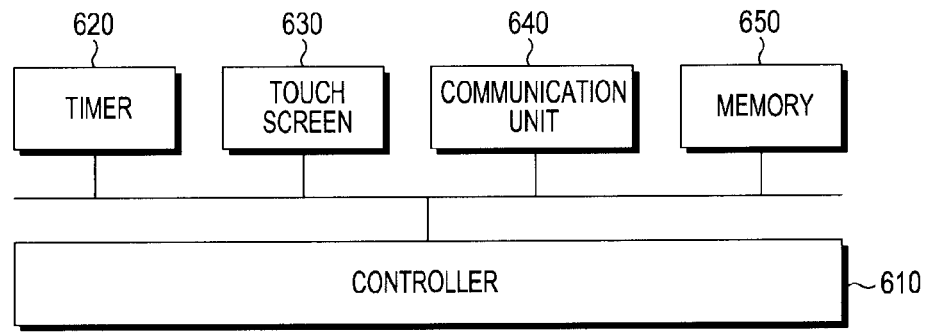
FIG. 6 is a block diagram of a system for controlling a time period of driving a backlight, according to an embodiment of the present invention.

FIG. 6 shows a block diagram of an apparatus for controlling a time period of driving a backlight. A controller 610 identifies a network use state of a communication unit 640 during driving of a timer 620. When the controller 610 determines that the communication unit 640 is in the network use state, the controller 610 determines whether an application, which has requested the transmission and reception of data, is activated. In response to this determination controls driving of the timer 620 by initializing a time period of driving the timer 620. In response to controller 610 determining that the application, which has requested the transmission and reception of the data, is in an inactive state, controller 610 performs a control operation for continuously driving the timer 620.

The controller 610 determines whether the relevant application is activated, based on a display state of the application. For example, when a display area associated with the application is being displayed, the controller 610 determines that the application is in an active state. When multiple applications are being displayed, the controller 610 determines that an application that the user has selected is in an active state. The controller 610 identifies whether a screen is updated in the display area, during driving of the timer 620, and controls driving of the timer 620 based on whether the screen is updated in the display area. In response to controller 610 determining that the screen is updated in the display area, unit 610 initializes a time period (e.g. a clock count) measured by the timer 620 by decrementing the clock count, for example. In response to the controller 610 determining that the screen is not updated in the display area, unit 610 performs a control operation and continuously drives the timer 620 preventing turn off of a backlight.

The determination as to whether the screen is updated is made for an area where an application is being displayed, or is made for a portion of an area associated with the application. The area portion being associated with a function of the application, for example. Further, the determination as to whether the screen is updated in one embodiment, is made for an area (a screen update sensing area) designated by the user.

When the user makes a request for designating a screen update sensing area, the controller 610 changes a display state to a predetermined display state, and receives data identifying the designation of the screen update sensing area in response to user command and in the changed display state. The changed display state may be a state in which a layer, for which the screen update sensing area is designated, overlaps layers displayed in a previous display state. Further, controller 610 performs a control operation to display a guide screen, for which the screen update sensing area is designated.

Controller 610 identifies whether a request for loading data for a display area (view configuration) is made during driving of the timer 620 and loads the requested data and controls driving of the timer 620 if presentation of the display area of an application making the request for loading the data is completed. Controller 610 controls driving of the timer 620 in a manner to prevent the backlight from being turned off until the view configuration of an application which has made the request for loading the data is completed. In an embodiment, the timer 620 counts a time period for turning off the backlight, a touch screen 630 displays various screen images and provides a user input derived signal to unit 610, in response to control of the controller 610. In addition, the communication unit 640 communicates with an external device through various communication networks in response to control commands of the controller 610 and memory 650 stores various media content, including text and moving images.

In other embodiments one or more other processing characteristics are controlled in response to determination a user is actively using a processing device via screen update determination, for example, as previously described. These other processing characteristics include, battery charging, power supply characteristics, processing device idle mode, processing device power consumption modes and settings, frequency of performing message transmission and message transmission type, semiconductor device low power mode and other characteristics enabling reduction of power consumption.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

According to the exemplary embodiments of the present invention, a time period of driving the backlight is controlled in such a manner as to reflect the intention of the user. Therefore, it is possible to prevent the occurrence of turning-off of the backlight that the user does not desire.

While the present invention has been shown and described with reference to certain embodiments thereof, it will be understood by those skilled in the art that various changes in form and details may be made therein without departing from the spirit and scope of the present invention as defined by the appended claims and equivalents thereof. No claim element herein is to be construed under the provisions of 35 U.S.C. 112, sixth paragraph, unless the element is expressly recited using the phrase "means for".

What is claimed is:

1. A method for controlling a screen of an electronic device, the method comprising:
    displaying, on at least one part of an entire area of the screen, a state of the electronic device on a bar area and a background screen which is updated according to a current time on a background area separated with the bar area;
    displaying an execution screen for an application on the background area among an entire area of the screen, wherein the entire area of the screen is illuminated by controlling a backlight to be turned on;
    controlling a timer to count a predetermined time to turn off the entire area of the screen in response to receiving a user input through a touch screen of the electronic device;
    receiving data related to the application corresponding to the at least one area of the screen from a communication network;
    controlling the timer to reset counting the predetermined time in response to receiving the data related to the application;
    controlling the timer to maintain counting the predetermined time from a remaining time in response to receiving data displayed on the at least one part except the at least one area among the entire of the screen while the timer counts the predetermined time; and
    controlling the backlight to be turned off at expiration of the timer, wherein when the backlight is turned off, the entire area of the screen changes from fully illuminated to fully unilluminated.

2. The method as claimed in claim 1, further comprising:
    identifying whether the data is associated with operation of a predetermined function of the application.

3. The method as claimed in claim 1, wherein the at least one area of the screen is designated by an input.

4. The method as claimed in claim 3, further comprising:
    before determining the at least one area of the screen, setting a display state of the screen.

5. The method as claimed in claim 4, wherein setting a display state of the screen comprises:
    generating a layer usable for designation of the at least area of the screen; and
    displaying the generated layer to be overlapped on the screen; and
    determining the at least area of the screen based on the input on the generated layer in the display state.

6. The method of claim 1 wherein the at least part comprises an area displaying an antenna reception indicator and an area displaying a time of day.

7. An apparatus which controls a screen, the apparatus comprising:
    a display unit;
    a timer, used to turn off the screen, which counts a predetermined time- to turn off the screen; and
    a controller configured for:
    controlling the display unit to display, on at least one part of an entire area of the screen, a state of the electronic device on a bar area and a background screen which is updated according to a current time on a background area separated with the bar area;
    controlling the display unit to display an execution screen for an application on the background area among the entire area of the screen, wherein the entire area of the screen is illuminated by controlling a backlight to be turned on,
    controlling the timer to count the predetermined time to turn off the entire area of the screen in response to receiving a user input through a touch screen of the electronic device,
    receiving data related to the application corresponding to the at least one area of the screen from a communication network,
    controlling the timer to reset counting the predetermined time in response to receiving the data related to the application,
    controlling the timer to maintain counting the predetermined time from a remaining time in response to receiving data displayed on the at least one part except the at least one among the entire area of the screen during the timer counts the predetermined time, and
    controlling the backlight to be turned off at expiration of the timer, wherein when the backlight is turned off, the entire area of the screen changes from fully illuminated to fully unilluminated.

8. The apparatus as claimed in claim 7, wherein the controller determines the at least part of the screen based on an external input.

9. The apparatus as claimed in claim 8, wherein the controller identifies whether the data related to the application is associated with operation of a predetermined function of the application.

10. The apparatus as claimed in claim 8, wherein the controller identifies whether the data related to the application is displayed in the at least area of the screen.

11. The apparatus as claimed in claim 8, wherein the controller identifies the at least area of the screen which is designated by the input.

12. The apparatus as claimed in claim 11, wherein the controller sets a display state of the screen when the external input for designating the at least area of the screen is determined.

13. The apparatus as claimed in claim 12, wherein the controller generates a layer for designation of the at least area of the screen and controls the display unit to display the generated layer to be overlapped on the screen.

* * * * *